United States Patent [19]
Simpson

[11] 3,805,657
[45] Apr. 23, 1974

[54] STEEL RULE ROTARY DIE AND METHOD OF MAKING SAME

[75] Inventor: Jack R. Simpson, Toledo, Ohio

[73] Assignee: Container Graphics Corporation, Toledo, Ohio

[22] Filed: Dec. 28, 1971

[21] Appl. No.: 213,016

[52] U.S. Cl. .................. 83/522, 83/665, 83/669, 83/701, 76/107 C
[51] Int. Cl. ............................................. B26f 1/10
[58] Field of Search ............ 83/522, 665, 669, 670, 83/673, 701; 76/107 C

[56] References Cited
UNITED STATES PATENTS

| | | | |
|---|---|---|---|
| 3,322,004 | 5/1967 | Wolfe | 76/107 C |
| 3,302,490 | 2/1967 | Bishop | 76/107 C |
| 3,188,900 | 6/1965 | Mauro | 76/107 C |
| 3,120,601 | 2/1964 | Berlin et al. | 76/107 C |
| 3,063,349 | 11/1962 | Phillips et al. | 76/107 C |
| 3,166,968 | 1/1965 | Krovskop | 76/107 C |

*Primary Examiner*—J. M. Meister
*Attorney, Agent, or Firm*—Allen D. Gutchess, Jr.

[57] ABSTRACT

A steel rule cutting die, particularly of the rotary type, is provided with an improved die plate or board. The new die plate is preferably made of a foamed plastic material which has a number of advantages over those heretofore known. The new die plate is of precise, uniform thickness throughout its length and width and the thickness of all die plates is always consistent. This consistency and uniformity enables a layout for the die plate to be drawn directly thereon without the use of expensive auxiliary layout or drawing equipment. Further, the new die plate will not change in thickness or warp due to humidity or temperature changes. The plate also is made with a precise radius of curvature so as to fit smoothly, without forcing, on a die cylinder or roll of a rotary cutting die machine. The die plate can further be provided with layout lines molded thereon to facilitate drawing a layout thereon. Countersunk holes for fastening the die plate to the die cylinder can also be molded directly in the die plate. Other indicia, such as scale lines along mutually perpendicular edges of the die plate to aid in drawing the layout with special T-squares, arrows to indicate direction of rotation, and marks for bridges, may also be molded directly on the die plate. It is also possible to mold steel cutting rules into the die plate.

5 Claims, 8 Drawing Figures 3,805,657

INVENTOR
JACK R. SIMPSON
BY
Allen D. Gutchess, Jr.
ATTORNEY

STEEL RULE ROTARY DIE AND METHOD OF MAKING SAME

This invention relates to a cutting die and particularly to an arcuate die plate for a rotary steel rule cutting die.

Steel rule dies of the type under consideration are used for shaping and cutting sheet material, usually corrugated board, into preformed blanks from which various types of containers, etc. are subsequently formed. The cutting dies can be either flat or rotary, although the latter are being increasingly used because of the higher production rates obtainable. With a rotary cutting die machine, a pair of cylinders are mounted in a supporting frame with a predetermined gap therebetween. One of these cylinders, usually the upper one, carries a die plate having the appropriate cutting rules, perforating rules, and creasing rules. The other cylinder has a yieldable layer of plastic material thereon, which supports the corrugated board as it is fed between the cylinders during rotation thereof.

Each of the steel rule dies must be carefully fabricated for each particular application. An arcuate die plate is first provided on which is laid out the appropriate shape of the blank desired, including lines for cuts, perforations, and folds. The layout for the die plate must be done with a special layout machine which is a relatively expensive piece of equipment. The layout machine compensates for the arcuate shape of the die plate to provide proper spacing between the cutting or other rules in spite of the arcuate configuration of the plate. The layout machine also produces proper dimensions for the layout despite variations in thickness of the die plates, from one to another, and also variations of thickness within each die plate itself. Saw cuts are then made in the die plate along the particular layout lines to provide slots in the proper locations for cutting rules, perforating rules, or creasing rules. These slots are discontinuous to form bridges between ends of the slots to provide continuity between the various portions or sections of the die plate. The steel rules are then notched at appropriate locations to fit over the bridges and into the slots. The lower arcuate edges of the steel rules seat against the die cylinder so that the upper edges of the steel rules are always a given distance from the cylinder, even if the die plate thickness varies somewhat. If the thickness of the die plate is excessive, the rule will not seat against the metal cylinder at the beginning but will work down against the cylinder over a period of time, biting into and weakening the bridge. This can cause the bridge to break which can increase the width of the slots in which the rule is held, thereby causing the rule to fly out of the cutting die. Alternately, the steel rule may break at the bridge and cause an overlap or other mis-matching of the rule at this point. Even if the rule or the bridge does not break, when the rule is finally forced against the metal cylinder, the effective length of the rule changes, resulting in a shaped or cut blank of incorrect dimensions.

In accordance with the invention, a steel rule rotary cutting die is provided utilizing an improved die plate or board which eliminates the disadvantages discussed above. The new steel rule die plate is molded of a foam plastic material which provides a smooth, hard, and durable product available in a range of densities. The new die plate is dimensionally stable throughout its area and all die plates are also of a constant, uniform thickness, as well as a consistent length and width. The foam plastic die plate is also dimensionally stable in spite of changes in humidity and temperature and will not warp. Further, the plate is made with a precise radius of curvature equal to that of the die cylinder on which it is to be mounted, so that a true fit will be achieved and the radius of the die plate will not be changed as it is tightened down on the cylinder.

The new steel rule die plate has a number of unique advantages in addition to overcoming the disadvantages inherent in the usual laminated plywood die plate. With the new die plate being made of a castable or moldable foam plastic material, countersunk holes can be molded into the die plate to provide preformed holes in the plate through which fasteners can be extended to affix the plate to the die cylinder. The countersunk holes can be arranged in any predetermined pattern and number, as will be discussed subsequently. Further, appropriately positioned small grooves can be formed in the mold to produce raised layout lines on the resulting molded die plate. For example, such lines can be placed one inch apart on the circumference and a distance somewhat less than one inch apart in a direction parallel to the axis, to compensate for the arc of the plate. Hence, layouts can be relatively easily produced on the die plate surface with a minimum of equipment and measurements being required. To achieve the layout lines on the surface, the mold is coated with wax or graphite, by way of example, prior to molding. The color of the wax or graphite is then imparted by the mold grooves on the resulting raised layout lines formed on the die plate surface. The raised layout lines also provide a contact surface on which the saw used to produce the cut for the steel rule slots can ride. Less drag results on the saw in this manner, rendering it easier to manipulate.

Rather than draw the layout on the surface of the molded die plate, it also is possible to draw the layout on a separate sheet of material, such as Mylar, and place this sheet in the mold. When the product is then cast, the sheet forms the surface of the die plate with the layout already thereon. Further, rather than subsequently cutting the slots in the die plate for the steel rules, it is possible to use inserts in the mold which are subsequently knocked out to leave the slots preformed therein. It is also possible to mold the steel rules directly into the die plate by a technique to be discussed subsequently. This not only has the advantage of eliminating the need for making saw cuts and assembling the steel rules but enables narrower steel rules to be employed since, when molded into the die plates, they need not extend completely therethrough so as to be seated against the die cylinder.

Scale lines can be molded along one or both longitudinal and circumferentially extending edges of the die plate, with special T-squares then used therewith to lay out the desired pattern. Marks for bridges can also be molded into the die plate and arrows similarly made to indicate the direction the die plate should rotate when mounted on the cutting die machine. In addition, the edges of the die plate can be drafted or tapered inwardly so as to assure true abutting surfaces when two or more die plates are fastened on a single die cylinder, either circumferentially or side-by-side. The uniform, consistent thickness of the die plates also assures that the abutting surfaces will meet smoothly without any offset therein. If is also possible with the invention to make a die plate of any given desired width or length by using inserts in the mold. Hence, no waste material need result.

It is, therefore, a principal object of the invention to provide an improved steel rule cutting die having the advantages and improvements discussed above.

Many other objects and advantages of the invention will be apparent from the following detailed description of preferred embodiments thereof, reference being made to the accompanying drawings, in which.

Figure 1:
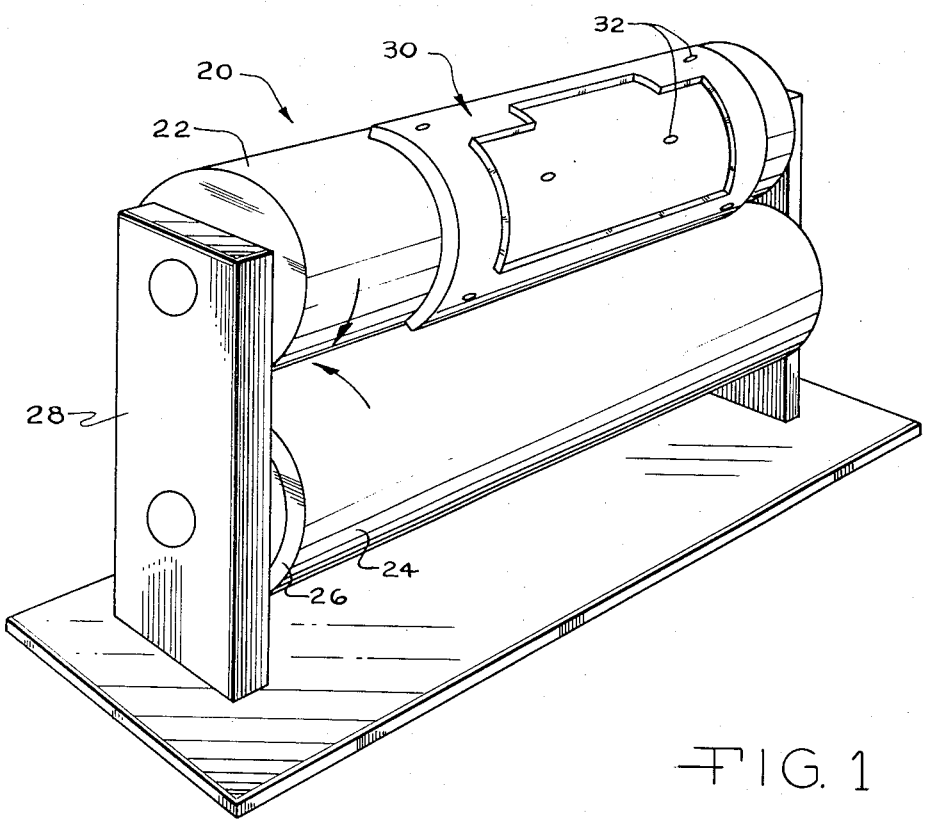
FIG. 1 is a schematic view in perspective of a rotary cutting die machine embodying the invention.

Referring to FIG. 1, a rotary die cutting machine is indicated at 20 and includes an upper die cylinder or roll 22 and a lower, back-up cylinder or roll 24. A somewhat resilient layer 26 of plastic material is located on the back-up cylinder 24. The cylinders are rotatably mounted in a frame or stand 28 and are rotated in the direction of the arrows by suitable drive means (not shown). Corrugated board or other suitable material is fed between the rolls 22 and 24 where it is engaged by a rotary cutting die 30 and shaped and formed into a blank from which containers or other desired products can be formed. The cutting die is fastened to the upper cylinder 22 by suitable fasteners 32.

The rotary die 30 basically includes a die plate or board 34 from which steel rules 36 project. Heretofore, the die plate 34 has been made of high quality plywood, nominally five-eighths inch in thickness, and with a predetermined radius of curvature. The plywood boards may actually vary from about nine-sixteenths inch to five-eighths inch or more in thickness and may vary by almost as much over the area of an individual board. Further, the boards may warp and change their radius of curvature which changes the effective circumferential dimensions thereof. The board is also subjected to dimensional changes due to humidity and temperature. Also, if the radius of curvature of the board does not correspond is the radius of the die cylinder 22, then the circumferential dimensions of the board will also change when it it tightened down against the cylinder.

In producing the cutting die 30, since there heretofore have been variations in the thickness of the die plate or board, it has been possible to lay out directly on the surface the lines for the slots which are to receive the steel rules. Such layouts have had to be made on a relatively expensive machine which enables the layout to be drawn accurately without regard to irregularities in the surface of the die plate. If the surface were true and the thickness of the cutting die plate uniform, the layout could be made directly on the surface of the die plate since the dimensional changes required to compensate for the radius of curvature of the die plate can be readily determined and a scale set accordingly. With the die plate 34 made according to the invention, thickness uniformity is achieved and the layout can be made directly on the surface to eliminate the expensive special layout machine. The plate 34 can be provided with raised, circumferentially extending layout lines 38 which are spaced apart a uniform distance such as one inch and the plate also can be provided with axially extending layout lines 40 which are uniformly spaced a distance less than one inch to compensate for the radius of curvature of the plate. These lines can then be used to draw the necessary layout lines on which the saw cuts for the steel rule slots are to be made, with a minimum of time and effort.

The saw cuts for the slots to receive the steel rule dies can be made by the same sabre saw used to cut the slots in conventional die plates, with bridges left in the slots to provide structural continuity between the various portions of the die plates. Notches are then made at corresponding parts of the steel rules to fit over the bridges. If the die plate is of excessive thickness, the steel rules will cut onto the top of the bridge as they work down and seat against the die cylinder over a period of time. This may cause the bridge to break and the slots to widen. In such an instance, the steel rule otherwise frictionally held therein will fly out and possibly cause damage or injury. Alternately, the steel rules may break above the bridges and overlap. In any event, the effective length of the circumferentially disposed steel rule will change as the rule works down against the die cylinder, resulting in an inaccurate blank.

The cutting die 30 also includes countersunk holes 42 at appropriate places in the cutting die plate 34. These holes can be preformed at preselected locations when the cutting die 34 is molded.

The cutting die is molded of a castable or moldable plastic material and preferably a polyurethane foam material. Such a material can be molded to a precise, uniform thickness which will neither vary over the area of any given plate nor from plate to plate. Further, a smooth, durable surface is achieved with this material and a durable plate resistant to abuse and shocks is achieved. The die plate 34 can be made in a range of densities which depends upon the type of polyurethane foam material used and the amount supplied to the mold when the die plate is to be formed. By way of example, the board can be made in an apparent density of 32 to 42 pounds per cubic foot of a polyurethane foam material obtained from the General Latex Chemical Corporation of Ashland, Ohio under the designation XR-34. Because the foam material can be foamed in situ in the mold, the density can be controlled by the quantity of the foam material supplied to the mold. In the above example, the material comes in separate containers as a foamable plastic and as a hardener and foaming agent. For producing a die plate having a 32-inch circumference, a 48-inch length, with an inside diameter of 19 3/16 inches and an outside diameter of 20 7/16 inches, one gallon of each material was employed, these being simply first mixed together and then poured into the mold.

Figure 3:
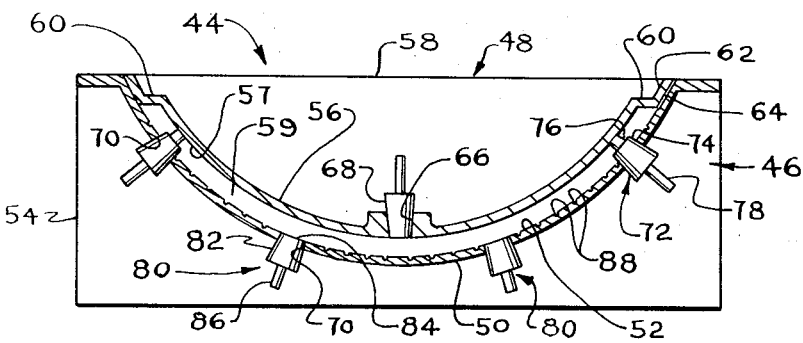
FIG. 3 is a somewhat schematic view in transverse cross section taken through a mold for making a rotary steel rule die plate similar to that of FIG. 2.

A suitable mold for producing the die plate 34 as indicated at 44 in FIG. 3. The mold 44 includes a lower, female mold half 46 and an upper, male mold half 48. Both mold halves, for instance, can be made of cast aluminum with the mold surfaces polished. The lower mold half 46 includes an arcuate mold wall 50 having a concave inner mold surface 52. A plurality of transversely extending ribs 54 extend outwardly from the mold wall 50 and are suitably spaced to provide structural support and rigidity for the mold wall 50. The upper mold half 48 includes an arcuate mold wall 56 having a convex mold surface 57 and having the same center of curvature as the mold wall 50. The wall 56 also has transversely extending ribs 58 to provide the proper strength and rigidity for the mold wall 56 so as to maintain the desired thickness of the resulting die plate even under the pressures that may be experienced from the polyurethane foam material foaming in situ in a confined mold cavity 59 formed by the walls 50 and 56.

Offsets 60 at upper end portions of the mold wall 56 form the ends of the die plate, with flanges 62 extending upwardly beyond the offsets in contact with the mold wall 50. Suitable event passages 64 can be formed between the old wall 50 and the flanges 62 to enable the escape of gases from the mold cavity during foaming and expansion of the polyurethane foam material. The foam material, in this instance, is supplied centrally to the mold cavity through a supply port 66 having a suitable plug 68. The foam material thereby supplied to the center of the cavity 59 foams upwardly and outwardly to the ends thereof with any impurities tending to concentrate only at the upper edges of the die plate.

The countersunk holes 42 in the die plate 34 can be formed in any of a variety of positions corresponding to any of a number of threaded holes provided in the cylinder 22. The number of the countersunk holes 42 and the fasteners 32 depend upon the size of the die plate, including the width and length, and also upon the particular size and shape of the blank to be made. To produce the countersunk holes 42 in the die plate 34, a plurality of openings 70 are provided in the mold wall 50 in positions corresponding to the positions of the threaded holes in the cylinder 22. Wherever one of the countersunk holes 42 is desired in the die plate 34, a die insert 72 is extended into the appropriate opening 70. The insert 72 has an enlarged cylindrical portion 74 which provides the countersink for the head of the fastener and a small cylindrical portion 76 which provides the passage for the shank of the fastener 32. The end of the cylindrical portion 76 abuts the mold wall 56 and the enlarged portion 74 fills the appropriate one of the openings 70. The insert 72 further includes an outwardly extending stem 78 which can be backed up by a suitable bracket or support (not shown) to hold the insert in the mold cavity despite pressure of the foam material. Both of the portions 74 and 76 have suitable drafts or tapers to enable the inserts to be withdrawn from the mold cavity after the die plate 34 has been poured, hardened, and is ready for removal by separating the upper mold half 48 from the lower mold half 46. For the openings 70 at which no countersunk hole is desired, a flush plug 80 is provided. The plug 80 has an enlarged portion 82 with a surface 84 which fills the opening 70 and provides a flush surface with the inner surface 52 of the mold wall 50. The flush plug 80 also has a stem 86 which is backed up by a suitable support or bracket (not shown).

The mold surface 52 of the mold wall 50 is provided with a plurality of criss-crossed grooves 88, which need only be approximately 0.002 inch in depth, to form the raised layout lines 38 and 40 on the die plate surface. The mold surfaces can be sprayed with a suitable release agent such as wax, graphite, or silicone material prior to molding. This material can be colored so that, after the molded die plate is removed, the color will be retained on the raised layout lines 38 and 40 resulting frokm the grooves 88.

Figure 4:
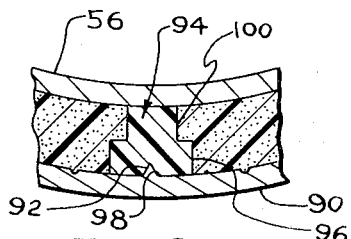
FIG. 4 is an enlarged, fragmentary view in section of a mold, die plate, and insert by means of which countersunk holes can be formed in a die plate.

Rather than employing the removable die inserts 72, a modified mold wall 90 as shown in FIG. 4 can be used, this wall differing from the mold wall 50 in that it has none of the openings 70. Wherever one of the countersunk holes 42 may be desired in the die plate, an inwardly extending small conical projection 92 is provided on the mold wall 90 in place of the openings 70. A countersunk insert 94 can then be placed in the desired location. The insert 94 includes an enlarged head portion 96 having a recess 98 received on the projection 92, along with a stem 100 which abuts the mold wall 56. The insert 94 is then held tightly in place even during the foaming action of the foam plastic materal. After the resulting die plate 34 is removed from the mold, the insert 94 can be knocked out to leave the countersunk holes 42. The insert, by way of example, can be made of a slippery plastic material or can be a silicone-impregnated rubber.

Figure 5:
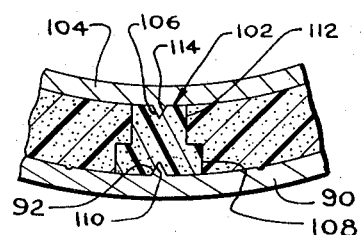
FIG. 5 is an enlarged, fragmentary view in section of a mold, die plate, and modified insert by means of which countersunk holes can be formed in a die plate.

Rather than employing the inserts 94 which are knocked out and re-used, an insert 102 of FIG. 5 can be employed. This insert can be made of the same material as the polyurethane foam material used for the die plate and can be covered with a silicone or other suitable coating when it is placed in the mold. In this instance, the same mold wall 90 is employed with the projections 92 and a modified mold wall 104 is provided for the upper mold half, this mold wall having conical projections 106 radially aligned with the projections 92. The mold insert 102 also has a head 108 with a conical recess 110 for the projection 92, and has a stem 112 with a conical recess 114, in this instance, corresponding to the conical projection 106. The inserts 102 are thus held firmly in place by both of the projections 92 and 106. Further, the recesses 110 and 114 are visible at the surfaces of the die plate. Since the inserts 102 are made of the same material as the die plate, they might not otherwise be readily visible. In this instance, the inserts 102 form a more-or-less permanent part of the die plate 34. They remain so until the die maker desires to remove certain ones of them to leave the countersunk holes 42. At that time, he simply knocks out the desired inserts 102 from the back surface of the die plate, leaving the remainder of the inserts as part of the die plate. Thus, the positions of the countersunk holes can be tailor-made at the time the rotary die is fabricated.

Figure 6:
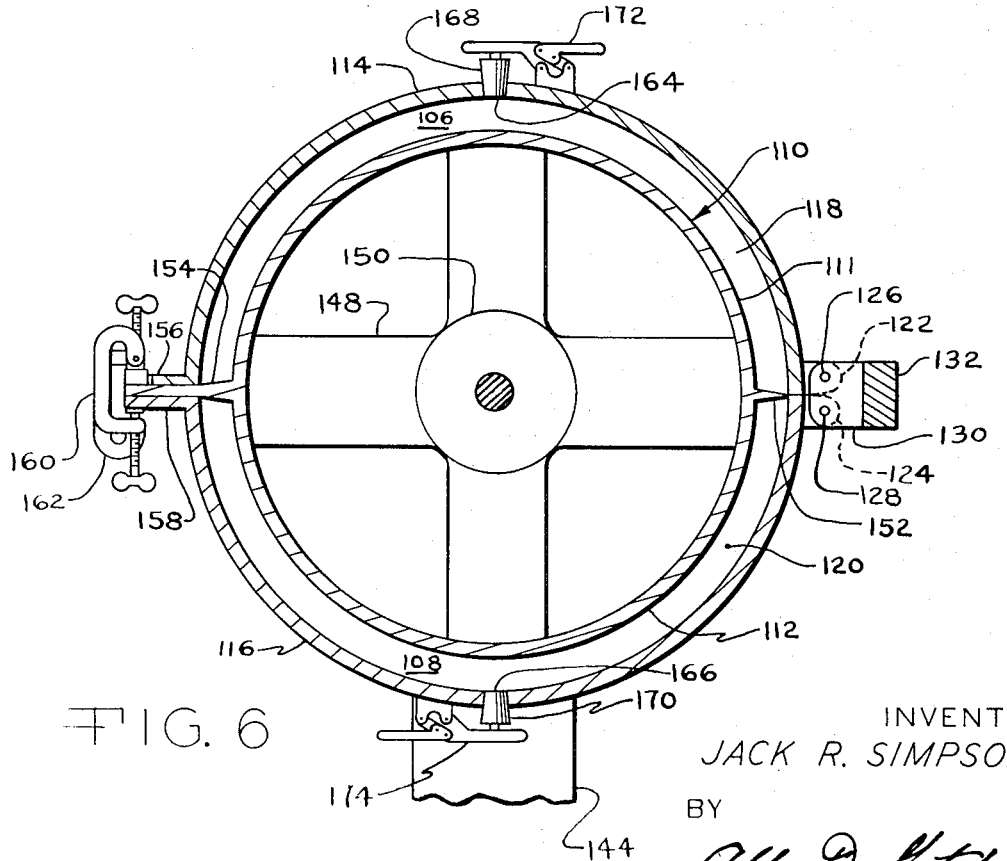
FIG. 6 is a view in transverse cross section taken through a modified mold for making rotary die plates.
Figure 7:
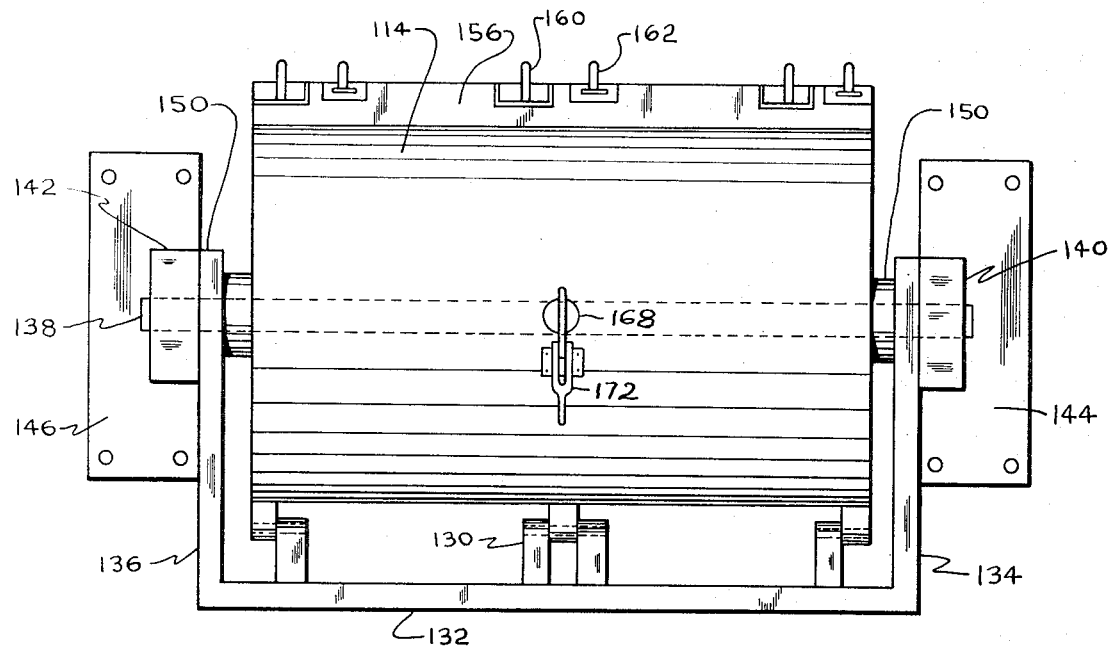
FIG. 7 is a plan view, on a smaller scale, of the mold of FIG. 6.

FIGS. 6 and 7 show molding apparatus 104 having two mold cavities 106 and 108 by means of which the moldable die plates can be made more rapidly. The apparatus 104 includes an inner cylinder 110 which forms inner arcuate mold walls 111 and 112 for the two mold cavities. Two outer, semi-circular mold walls 114 and 116 complete the cavities along with ends walls 118 and 120 thereof. The outer mold walls 114 and 116 have projecting ears 122 and 124 which are pivotally attached by pins 126 and 128 to ears 130 extending from a frame 132. The frame 132 has radially extending arms 134 and 136 which are pivotally supported on the axle 138, the latter being rotatably supported by bearings 140 and 142 mounted on supporting frames 144 and 146. The inner cylinder 110 is rotatably mounted on the same axle 138 by spiders 148 and hubs 150 located adjacent the frame arms 134 and 136.

The inner cylinder 110 also has a tapered partition 152 separating ends of the mold cavities 106 and 108 adjacent the hinges, and has a longer projecting flange 154 diametrically opposite which also separates the two cavities. The flange 154 extends beyond the outer walls 114 and 116 between flanges 156 and 158 of these walls. The individual outer walls 114 and 116 have suitable clamps 160 and 162 pivotally attached to the respective flanges 156 and 158 to hold the individual outer mold walls 114 and 116 closed against the flange 154 and enable them to be opened separately. Each of the mold cavities 106 and 108 is supplied with foam through openings 164 and 166 which have plugs 168 and 170 held closed by over-center latch devices 172 and 174.

In operation, with both of the outer mold walls 114 and 116 closed and clamped and with the mold cavities 106 and 108 in the position shown in FIG. 6, the plug 168 is removed from the opening 164 and a predetermined quantity of foamable plastic material is mixed from separate component supplies and is supplied to the cavity 106. The plug 168 is again inserted in the opening 164 and the mold apparatus is rotated 180°. This places the cavity 106 in the same position as the mold cavity 52 of FIG. 3 and enables the foam material to foam in situ and proceed toward the now upper ends of the cavity. Suitable vents can be provided thereat, as before.

While the foamed material is curing or hardening in the cavity 106 when in the lower position, the plug 170 can be removed from the opening 166 for the cavity 108 and foamable material supplied thereto. The apparatus is then rotated 180° again to place the filled mold cavity 108 at the bottom for hardening. The clamps 160 for the outer wall 114 are then loosened and the hardened, molded die plate removed. The clamps 160 are then tightened once again, the plug 168 is removed from the opening 164, and the cavity 106 is supplied with another batch of foamable plastic material. The curing time for the foamable plastic material depends on the type used and also on temperature. The molds can be heated to shorten the hardening or curing time.

Figure 2:
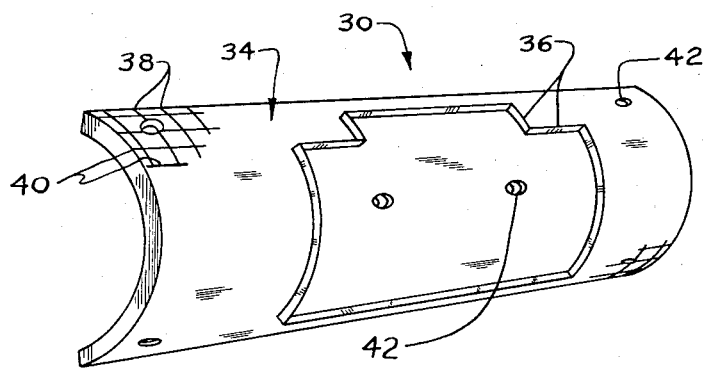
FIG. 2 is a somewhat enlarged view in perspective of the rotary steel rule cutting die shown in FIG. 1.
Figure 8:
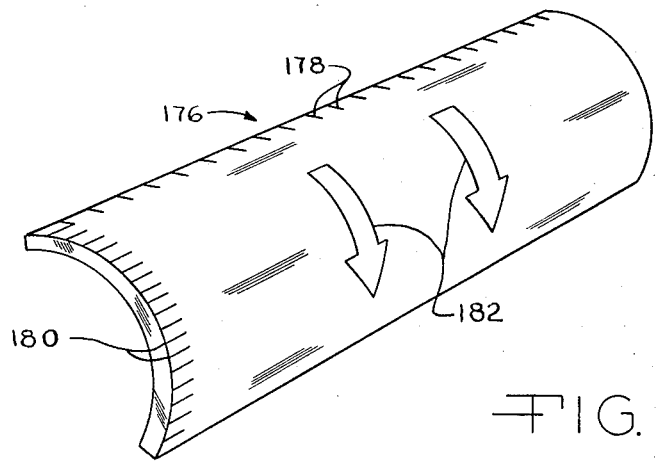
FIG. 8 is a view in perspective of a modified die plate made in accordance with the invention.

Referring now to FIG. 8, a modified steel rule cutting die plate according to the invention is indicated at 176. The die plate 176 is similar to the die plate 34 but has scale lines 178 formed along at least one of the longitudinally or axially extending edges of the die plate, and has circumferentially extending scale lines 180 extending along at least one of the circumferential edges of the die plate. Specially shaped T-squares can then be employed along the two mutually perpendicular, scaled edges to provide the desired layout on the main surface on the die plate. The scale lines can be slightly raised, being made by grooves formed on the concave surface of the mold similar to the grooves for the layout lines of FIG. 2 and 3, or the scale lines can be raised or embossed on the mold surface to provide recessed scale lines. The scale lines are preferably colored, as before.

Arrows 182 are also formed on the surface of the die plate 176 by appropriately shaped recessed or embossed lines in the mold cavity. The arrows show the direction in which the die plate should be rotated on the die cylinder. Many dies are designed for particular blanks such that they can effectively rotate only in one direction and will not shape the blank properly or may damage the die if rotated in the opposite direction.

Various modifications of the above described embodiments of the invention will be apparent to those skilled in the art and it is to be understood that such modifications can be made without departing from the scope of the invention, if they are within the spirit and the tenor of the accompanying claims.

I claim:

1. A metal rule rotary die comprising a die plate of predetermined shape and thickness extending straight in one direction and arcuately with a predetermined radius in a transverse direction, the convex surface of said die plate having a plurality of raised lines thereon extending in mutually perpendicular directions, said die plate having a plurality of metal rules held thereby and extending therefrom, said die plate being made of a plastic material.

2. A metal rule rotary die comprising a die plate of predetermined shape and thickness extending straight in one direction and arcuately with a predetermined radius in a transverse direction, said die plate having a scale in the form of raised lines extending along two mutually perpendicular edges thereof, said die plate having a plurality of metal rules held thereby and extending therefrom, said die plate being made of a plastic material.

3. A metal rule rotary die comprising a die plate of predetermined shape and thickness extending straight in one direction and arcuately with a predetermined radius in a transverse direction, the convex surface of said die plate having raised lines thereon, said die plate having a plurality of metal rules held thereby and extending therefrom, said die plate having a plurality of separable inserts therein, extending completely through said plate, said inserts being selectively removable to provide openings extending through said die plate, said die plate being made of a moldable, polyurethane foam material and having an apparent density of 32 to 42 pounds per cubic foot.

4. A metal rule rotary die comprising a die plate of predetermined shape and thickness extending straight in one direction and arcuately with a predetermined radius in a transverse direction, said die plate having a plurality of separable inserts therein, extending completely through said plate and being flush with the convex surface thereof, said inserts being selectively removable to enable the resulting openings to receive fasteners to mount said die plate on a support, said die plate having a plurality of metal rules held thereby and extending therefrom, said die plate being made of a plastic material.

5. A rotary die according to claim 4 characterized by said inserts being made of the same plastic material as said plate.

* * * * *